A. POLACHECK.
FIXTURE COUPLING.
APPLICATION FILED SEPT. 5, 1911.

1,062,664.

Patented May 27, 1913.

WITNESSES.
L. T. Thurer
Katherine Holt

INVENTORS.
Arthur Polacheck
By Morsell & Caldwell
ATTORNEYS.

COLUMBIA PLANOGRAPH CO., WASHINGTON, D. C.

UNITED STATES PATENT OFFICE.

ARTHUR POLACHECK, OF MILWAUKEE, WISCONSIN, ASSIGNOR TO CHAS. POLACHECK & BRO. CO., OF MILWAUKEE, WISCONSIN, A CORPORATION OF WISCONSIN.

FIXTURE-COUPLING.

1,062,664.  Specification of Letters Patent.  Patented May 27, 1913.

Application filed September 5, 1911. Serial No. 647,475.

*To all whom it may concern:*

Be it known that I, ARTHUR POLACHECK, a citizen of the United States, residing in Milwaukee, in the county of Milwaukee and State of Wisconsin, have invented new and useful Improvements in Fixture-Couplings, of which the following is a description, reference being had to the accompanying drawings, which are a part of this specification.

This invention has for its object to provide a coupling for electric lighting fixtures which will be strong and substantial while being quickly and easily connected and disconnected and which will facilitate the wiring.

Another object of this invention is to provide such a fixture coupling which will allow of the fixture hanging vertically even though the stub or pipe to which it is connected is inclined.

With the above and other objects in view the invention consists in the fixture coupling as herein claimed and all equivalents.

Figure 1:
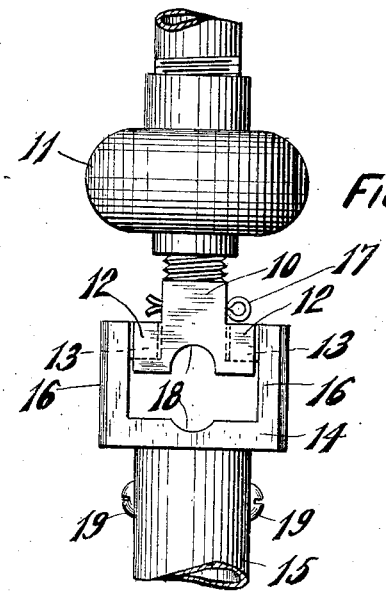
Figure 2:
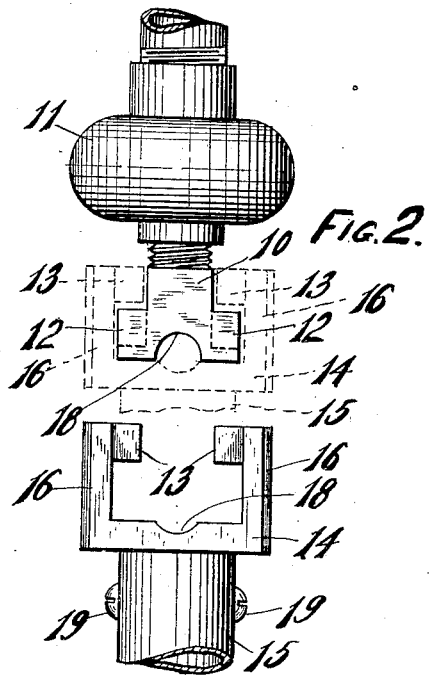
Figure 3:
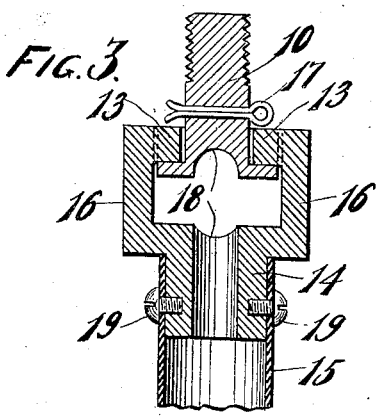
Figure 4:
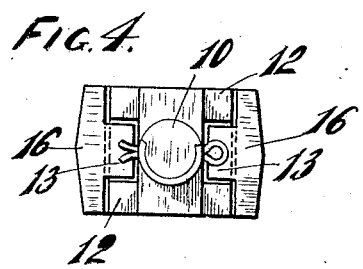

Referring to the accompanying drawing in which like characters of reference indicate the same parts in the different views: Figure 1 is an elevation of a fixture coupling constructed in accordance with this invention with the parts assembled; Fig. 2 is a similar view thereof, with the members disconnected and showing, by dotted lines, the positions of the parts in the act of connecting or disconnecting the coupling; Fig. 3 is a sectional view of the coupling assembled; and Fig. 4 is a plan view thereof.

In these drawings 10 indicates a coupling member which is threaded at its upper end to engage an insulator 11 or a pipe stub or spider, or other ceiling construction from which the fixture is to be suspended, and which has laterally extending recessed flanges 12 at its lower end, the recesses of which form pockets to receive a pair of inwardly projecting hooks or lugs 13 on a companion coupling member 14. Coupling member 14 is tubular to fit within the tubing 15 of the fixture and to permit of the lamp cord, not shown, to pass therethrough. The tube 15 may be held to the coupling member 14 by means of screws 19 passing through opposite openings in the tube and threaded in the coupling member 14. The upper end of the coupling member 14 has upwardly extending side pieces 16 standing a sufficient distance apart to permit of the lower end of coupling member 10 to pass freely therebetween beneath the lugs 13, as shown in Fig. 2. When the lower end of the coupling member 10 is thus entered between the side pieces 16 of coupling member 14 and is centered with relation thereto, the lugs 13 are in position to drop into the pockets formed by the recesses in flanges 12, and their engagement with the bottom of said pockets forms the suspension bearing between the two members of the coupling for supporting the fixture. It may be advisable to provide a means for preventing the coupling member 14 being lifted accidentally, and such means is shown as a cotter pin 17 passing through an opening in coupling member 10 with its ends projecting above the lugs 13 to confine them in the pockets.

Inasmuch as the height of the flanges 12 is substantially the same as the distance between the main portion of coupling member 14 and its inwardly extending lugs 13, and said flanges are required to pass through this space in assembling and disconnecting the coupling, it is desirable to provide a recess or channel 18 in one or both of the coupling members to receive the end of the lamp cord and permit it to extend out from the tube 15 without interfering with the passage of the coupling member 10 through the yoke formed by the side pieces of coupling member 14.

From the foregoing it will be seen that the operation of coupling a fixture by means of this invention is exceedingly simple, it being only necessary to thread the member 10 into the ceiling connection and to secure the member 14 to the fixture when the fixture may be raised to receive the lower end of member 10 within the yoke of member 14, and when the parts are centered and the fixture is released, the lugs 13, by seating in the pockets of flanges 12, firmly hold the fixture in place against movement in any direction except a direct lifting motion, which may be provided against by the insertion of the cotter pin 17. The parts are purposely loosely fitted to permit of a slight movement in any direction on behalf of the lighting fixture, so that it may hang vertical in all cases, whether the part to which member 10 is secured is vertical or not. The provision of the recesses 18 greatly facilitates the wiring, for the lamp cord of the fixture may be left protruding during the coupling operation and then only requires to be connected with the ceiling wires above.

What I claim as new and desire to secure by Letters Patent, is:

A coupling for lighting fixtures, comprising an upper coupling member adapted for overhead support by a ceiling connection and provided with a T-shaped rectangular head, a lower coupling member having parallel upstanding side pieces spaced apart approximately the width of the head, inwardly extending rectangular lugs on the sidepieces forming beneath them a socket of approximately the size and shape of the head to receive the head in a horizontal movement of the lower coupling member, the laterally projecting parts of the T-shaped head having pockets at their central portions in which said lugs fit with a downward movement of the lower coupling member, the rectangular shape of the head and its socket and the rectangular shape of the lugs and their pockets preventing a turning or a tilting action of the lower coupling member.

In testimony whereof, I affix my signature, in presence of two witnesses.

ARTHUR POLACHECK.

Witnesses:
C. H. KEENEY,
KATHERINE HOLT.

Copies of this patent may be obtained for five cents each, by addressing the "Commissioner of Patents, Washington, D. C."